(12) United States Patent
Gallmeier et al.

(10) Patent No.: US 7,770,115 B2
(45) Date of Patent: Aug. 3, 2010

(54) SYSTEM AND METHOD FOR CONTROLLING PRESENTATIONS AND VIDEOCONFERENCES USING HAND MOTIONS

(75) Inventors: Jonathan Gallmeier, Austin, TX (US); Alain Nimri, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 528 days.

(21) Appl. No.: 11/557,173

(22) Filed: Nov. 7, 2006

(65) Prior Publication Data

US 2008/0109724 A1    May 8, 2008

(51) Int. Cl.
*G06F 3/00* (2006.01)
*G06F 3/033* (2006.01)

(52) U.S. Cl. .................. 715/716; 715/761; 715/863

(58) Field of Classification Search ................. 715/716, 715/761, 863
See application file for complete search history.

(56) References Cited

U.S. PATENT DOCUMENTS 6,554,433 B1 *   4/2003   Holler .................... 353/79
6,600,475 B2 *   7/2003   Gutta et al. ............. 345/156

* cited by examiner

*Primary Examiner*—Sara England
*Assistant Examiner*—Shashi K Becker
(74) *Attorney, Agent, or Firm*—Wong, Cabello, Lutsch, Rutherford & Brucculeri LLP

(57) ABSTRACT

A system and method are disclosed for controlling presentations and videoconference using hand motions. A camera captures video of an area relative to content displayed on a display device from a content source. A control unit is communicatively coupled to the content source, the display device, and the camera. The control unit receives captured video from the camera. The control unit detects a hand motion by a presenter that occurs within the captured video and determines the location within the captured video of at least one control for controlling the presentation or videoconference. The control unit determines if the detected hand motion occurs within the determined location of the at least one control, and the control unit controls the content source based on the determined control.

22 Claims, 2 Drawing Sheets

SYSTEM AND METHOD FOR CONTROLLING PRESENTATIONS AND VIDEOCONFERENCES USING HAND MOTIONS

FIELD OF THE DISCLOSURE

The subject matter of the present disclosure relates to a system and method for controlling presentations using hand or other physical motions by the presenter relative to the displayed presentation content.

BACKGROUND OF THE DISCLOSURE

Speakers often use content, such as PowerPoint slides, Excel spreadsheets, etc., during a presentation or videoconference. Often, the speakers must control the content themselves or have a second person control the content for them during the presentation or videoconference. These ways of controlling content can cause distractions. For example, having to call out instructions to another person to flip the slides of a presentation forward or backward can be distracting or not understood. During a presentation, for example, the audience may ask questions that often require jumping to random slides or pages. If a second person is controlling the content, the speaker has to relay instructions to the second person to move to the correct slide.

The subject matter of the present disclosure is directed to overcoming, or at least reducing the effects of, one or more of the problems set forth above.

SUMMARY OF THE DISCLOSURE

A system and method are disclosed for controlling presentations and videoconference using hand motions. In one embodiment, the system includes a content source, a display, a camera, and a control unit. The content source can be a computer, a videoconferencing system, a video camera, or other device that provides content. The content can be moving video, images, presentation slides, spreadsheets, live computer screen shots, or other displayable subject matter. The camera captures video of an area relative to the content being displayed on the display device from the content source. The control unit is communicatively coupled to the content source, the display device, and the camera. The control unit receives captured video from the camera. The control unit detects a hand motion by a presenter that occurs within the captured video and determines the location within the captured video of at least one control for controlling the presentation or videoconference. The control unit determines if the detected hand motion has occurred within the determined location of the control and controls the content source based on the control triggered by the hand motion.

The at least one control can be a small icon included in the displayed content. In this way, the system allows natural hand motions to control the content of a presentation or videoconference by providing the small icon in the displayed content. To change content or control aspects of the presentation or videoconference, the speaker or presenter needs only to move a hand relative to the icon so that the camera captures the hand motion and the control unit detects that the control of the icon has been selected.

The control icons can be implemented as an overlay on top of the content video, or the control icons can be included as part of the content in the form of an image incorporated into a slide presentation. In another alternative, the control icons can be a physical image placed on the wall behind the presenter or speaker in the view angle of the camera.

The camera is used to capture motions of the speaker regardless of which of the above type of icon is used. A particular icon is activated when motion vectors in the captured video reach a predetermined threshold in the area or location of the icon. To place icons within the content stream, the content is preferably displayed as a background image using a chroma key technique, and an image pattern matching algorithm is preferably used to find the placement of the icon. If the icon is overlaid on top of the camera video after the camera has captured the video of the speaker, then the placement or location of the icon will be already known in advance so that the control unit will not need to perform an image pattern matching algorithm to locate the icon.

In one benefit of the system, speakers or presenters using the system can naturally control a presentation or videoconference without requiring a second person to change presentation slides, change content, or perform any other various types of control.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
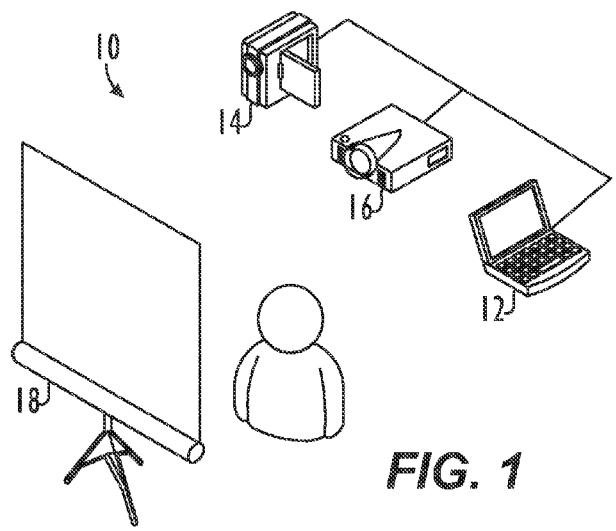
FIG. 1 illustrates an embodiment of a presentation system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, an embodiment of a presentation system 10 according to certain teachings of the present disclosure is illustrated. The presentation system 10 includes a control unit 12, a camera 14, and one or more content devices 16 and 18. In the present embodiment, the control unit 12 is shown as a computer, and the camera 14 is shown as a separate video camera. In an alternative embodiment, the control unit 12 and the camera 14 can be incorporated into a single videoconferencing unit. In addition, the present embodiment shows the content devices as a projector 16 and screen 18. In alternative embodiments, the one or more content devices can include a television screen or a display coupled to a videoconferencing unit, a computer, or the like.

The presentation system 10 allows the presenter to use physical motions or movements to control the presentation and the content. As described below, the presenter can use hand motions relative to a video applet, displayed icon, or area to control the playing of video, to change slides in a presentation, and to perform other related tasks associated with a presentation. For example, the control unit 12 includes presentation software for presenting content, such as a PowerPoint® presentation. The control unit 12 provides the content to the projector 16, which then projects the content on the screen 18. In one embodiment, one or more video applets or visual icons are overlaid on the content presented on the screen. As the presenter conducts the presentation, the camera 14 captures video of motion made relative to the displayed icon on the screen 18. This captured video is provided to the control unit 12. In turn, the control unit 12 determines from the captured video whether the presenter has made a selection of a control on the displayed icon. If so, the control unit 12 controls the presentation of the content by performing the control selected by the presenter. In general, the video applets or visual icons can be placed as visual elements over captured video, can be placed as a physical object that is then captured in video, or can be incorporated into a content stream, such as being a visual button in Power point slide.

Figure 2A:
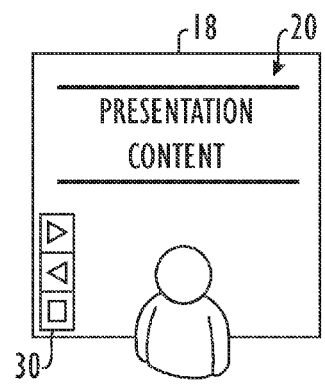
FIG. 2A illustrates an embodiment of a presentation control icon overlaying or incorporated into presentation content.

As noted above, one or more visual icons can overlay content being presented. In FIG. 2A, an example of a visual icon 30 is shown overlaying content 20 displayed on the screen 18. In one implementation, the icon 30 is incorporated into the presentation content. For example, the icon 30 can be added as a graphical element to a slide of a PowerPoint presentation. In another implementation, the icon 30 can be overlaid or transposed onto the content of the presentation. Either way, the camera (14; FIG. 1) is directed at the screen 18 or at least at the area of the icon 30. During the presentation, the camera (14) captures video of the area of the icon 30 in the event that the presenter makes any motions or movements over the icon 30 that would initiate a control.

Figure 2B:
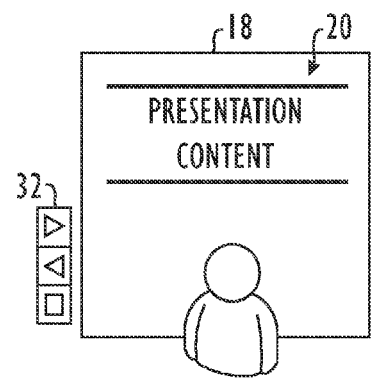
FIG. 2B illustrate an embodiment of a presentation control icon as a physical image placed adjacent presentation content.

In another example, FIG. 2B shows a physical icon 32 placed adjacent the content 20 being displayed on the screen 18. For example, the physical icon 32 can be a plaque or card positioned on a wall next to the screen 18. The camera (14; FIG. 1) directed at the icon 32 captures video of the area of the icon 32 in the event that the presenter makes a motion over one of the controls of the icon 32.

Figure 3:
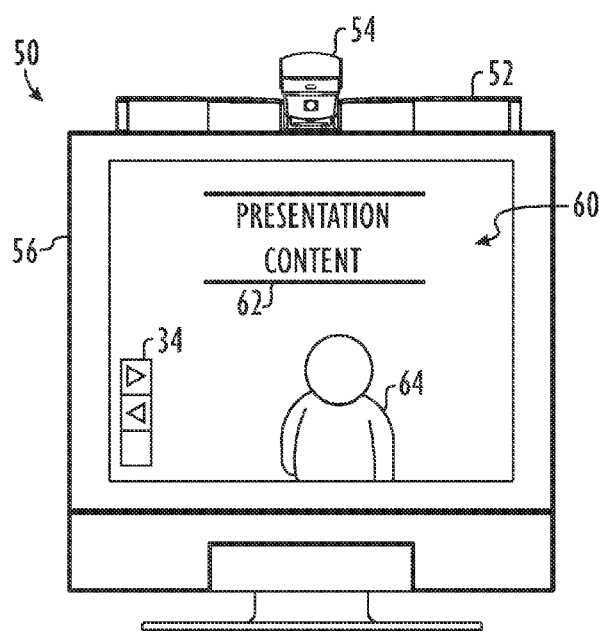
FIG. 3 illustrates another embodiment of a presentation system according to certain teachings of the present disclosure.

Referring to FIG. 3, another embodiment of a presentation system 50 according to certain teachings of the present disclosure is illustrated. In this embodiment, the presentation system 50 includes a videoconferencing unit 52 having an integral camera 54. The videoconferencing unit 52 is connected to a video display or television 56. The videoconferencing unit 52 is also connected to a network for videoconferencing using techniques known to those skilled in the art. The display 56 shows content 60 of a videoconference. In the present embodiment, the content 60 includes presentation material 62, such as presentation slides, video from the connected camera 54, video from a remote camera of another videoconferencing unit, video from a separate document camera, video from a computer, etc. The content 60 also includes video of a presenter 64 superimposed over the presentation material 62. In addition, an icon 34 is shown in the content 60 on the display 56.

As discussed above, there are several ways to include the icon 34 into the presentation system 50. The icon 34 can be incorporated as a visual element into the presentation material 62, whereby the incorporated icon 34 is presented on the display 56 as part of the presentation material 62. Alternatively, the icon 34 can be a visual element generated by the videoconferencing unit 52, connected computer, or the like and superimposed on the video of the presentation material 62 and/or the video of the presenter 64. In yet another alternative, the icon 34 can be a physical object having video of it captured by the camera 54 in conjunction with the video of the presenter 64 and superimposed over the presentation material 62.

Again, the presentation system 50 allows the presenter 64 to use physical motions or movements to control the presentation and the content 60. For example, the presenter 64, who is able to view herself superimposed on presentation material 62 on the display 56, can use hand motions relative to the displayed icon 34 to control the playing of video, to change slides in a presentation, and to perform other related tasks associated with a presentation.

As discussed above, the icon 34 can be incorporated as a visual element in the presentation material 62 shown on the display 56. For example, the icon 34 can be visual buttons added to slides of a PowerPoint presentation. Because the icon 34 is incorporated into the presentation material 62, the icon 34 will likely have a fixed or know location. The camera 54 captures video of the presenter 64 who in turn is able to see her own hand superimposed on the presentation materials 62 when she makes a hand motion within the area of the incorporated icon 34. The video from the camera 54 is analyzed to detect if a hand motion occurs within the known or fixed location of the icon 34. For example, the analysis determines motion vectors that occur within the video stream of the camera 54 and determine if those motion vectors exceed some predetermined threshold within an area of the icon 34. If the hand motion is detected, then the videoconferencing unit 50 determines what control has been invoked by the hand motion and configures an appropriate command, such as instructing to move to the next slide in a PowerPoint presentation, etc.

As discussed above, the icon 34 can be a visual element added to the video of the presenter 64 captured by the camera 54. The added icon 34 is shown on the display 56 along with the video of the presenter 64. Therefore, the presenter 64 is able to see her own hand when she makes a motion relative to the added icon 34. The video from the camera 54 is analyzed to detect if a hand motion occurs within the known or fixed location of the added icon 34, and the videoconferencing unit 50 determines which control has been invoked by the hand motion.

As discussed above, the icon 34 can be a physical element placed next to the presenter 64 (e.g., located on the wall behind the presenter 64). The location of the physically placed icon 64 can be determined from the video captured by the camera 54. The presenter 64 can make a hand motion relative to the physically placed icon 34, and the camera 54 can capture the video of the presenter's hand relative to the icon 34. The captured video can then be analyzed to detect if a hand motion occurs within the area of the icon 34, and the videoconferencing unit 50 can determine which control has been invoke by the hand motion.

In the embodiments of FIGS. 2A-2B and 3, the icons 30, 32, and 34 can have any of a number of potential controls for controlling a presentation. Each control can be displayed as a part of a separate area of the icons 30, 32, and 34 so that the presenter can move her hand or other object in the separate area to implement the desired control. For example, changing to the next slide in a PowerPoint presentation can simply require that the presenter move her hand over a graphical element of the icons 30, 32, and 34 corresponding to advancing to the next slide. Which controls are used on the icons 30, 32, and 34 as well as their size and placement can be user-defined and can depend on the particular implementation. In addition to controlling a presentation (e.g., moving to next slide, moving back a slide, etc.), embodiments of the disclosed system 100 can be used to control a mouse pointer in a desktop environment, to control camera movements of a videoconference, to control volume, contrast, brightness levels, and to control other aspects of a presentation or videoconference with hand motions.

Figure 4:
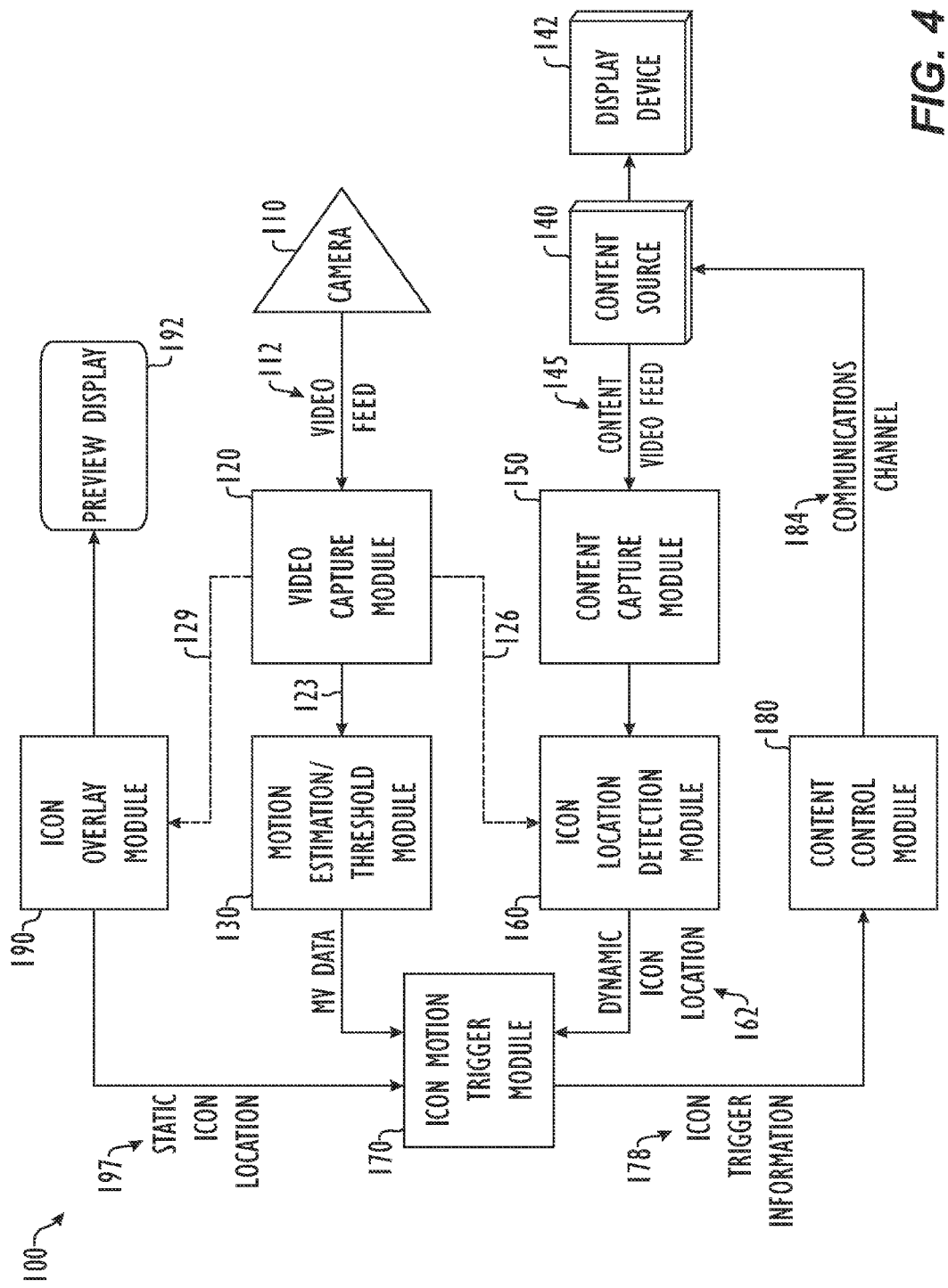
FIG. 4 illustrates the presentation system according to certain teachings of the present disclosure in schematic detail.

Given the above description, we now turn to a more detailed discussion of a presentation system according to certain teachings of the present disclosure. Referring to FIG. 4, an embodiment of a presentation system 100 according to certain teachings of the present disclosure is schematically illustrated. In the discussion that follows, some components of the presentation system 100 are discussed in terms of modules. It will be appreciated that these modules can be implemented as hardware, firmware, software, and any combination thereof. In addition, it will be appreciated that the components of the presentation system 100 can be incorporated into a single device, such as a videoconferencing unit or a control unit, or can be implemented across a plurality of separate devices coupled together, such as a computer, camera, and projector.

To capture video images relative to an icon, the presentation system 100 includes a camera 110 and a video capture module 120. To handle content, the presentation system 100 includes a content source 140 and a content capture module 150. To handle controls, the presentation system 100 includes an icon motion trigger module 170 and a content control module 180. Depending on how the icon is superimposed, incorporated, or added, the presentation system 100 uses either an icon location detection module 160 or an icon overlay module 190.

During operation, the camera 110 captures video and provides a video feed 112 to the video capture module 120. For videoconferencing, the camera 110 is typically directed at the presenter. In one embodiment, the icon (not shown) to be used by the presenter to control the presentation can be overlaid on or added to the video captured by the camera 110. Accordingly, the location of the icon and its various controls can be known, fixed, or readily determined by the system 100. In this embodiment, the video capture module 120 provides camera video via a path 129 to the icon overlay module 190. At the icon overlay module 190, the icon is overlaid on or added to video that is provided to the preview display 192. In this way, the presenter can see herself on the preview display 192 and can see the location of her hand relative to the icon that has been added to the original video from the camera 110. Because the location of the added icon is known or fixed, the icon overlay module 190 provides a static location 197 of the icon to the icon motion trigger module 170 that performs operation discussed later.

In another embodiment, the icon may not be overlaid on or added to the video from the camera 110. Instead, the icon may be a physical element placed at a random location within the field of view of the camera 110. In this embodiment, the location of the icon and its various controls must first be determined by the system 100. In this case, the video capture module 120 sends video to the icon location detection module 160. In turn, this module 160 determines the dynamic icon location. For example, the icon location detection module 160 can use an image pattern-matching algorithm known in the art to find the location of the icon and its various controls in the video from the camera 110. For example, the image pattern-matching algorithm can compare expected pattern or patterns of the icon and controls to portions of the video content captured with the camera 110 to determine matches. Once the location of the icon and its controls are determined, the module 160 provides the location 162 to the icon motion trigger module 170.

In another embodiment, the icon may be incorporated as a visual element in the content from the content source 140. For example, the icon may be a tool bar added to screens or slides of a presentation from the content source 140. In this embodiment, the content capture module 150 receives a content video feed from the content source 140 and sends captured content video to the icon location detection module 160. One embodiment of the disclosed system 100 can uses a chroma key technique and pattern-matching to detect the location of the icon. Because the icon is incorporated as a visual element within the content stream, the content can be displayed as a background image using a chroma key technique. The background image of the content can then be sampled, and the video pixels from the camera 110 that fall within the chroma range of the background pixels are placed in a background map. The edges can then be filtered to reduce edge effects. The icon location detection module 160 can then use an image pattern-matching algorithm to determine the location of the icon and the various controls in the content stream. Once determined, the module 160 provides the location 162 to the icon motion trigger module 170. Other algorithms known in the art can be used that can provide better chroma key edges and can reduce noise, but one skilled in the art will appreciate that computing costs must be considered for a particular implementation.

While the static or dynamic location of the icon is determined as discussed above, the video capture module 120 also provides video information to the motion estimation and threshold module 130. This module 130 determines vectors or values of motion ("motion vector data") occurring within the provided video content from the camera 110 and provides motion vector data to the trigger module 170. To determine motion vector data, the motion estimation and threshold module 130 can use algorithms known in the art for detecting motion within video. For example, the algorithm may be used to place boundaries around the determined icon or screen location and to then identify motion occurring within that boundary.

In one embodiment, the module 130 can determine motion vector data for the entire field of the video obtained by the video capture module 120. In this way, the motion estimation and threshold module 130 can ignore anomalies in the motion occurring in the captured video. For example, the module 130 could ignore data obtained when a substantial portion of the entire field has motion (e.g., when someone passes by the camera 110 during a presentation). In such a situation, it is preferred that the motion occurring in the captured video not trigger any of the controls of the icon even though motion has been detected in the area of the icon.

In alternative embodiments, the motion estimation and threshold module 130 can determine motion vector data for only predetermined portions of the video obtained by the video capture module 120. For example, the module 130 can focus on calculating motion vector data in only a predetermined quadrant of the video field where the icon would preferably be located. Such a focused analysis by the module 130 can be made initially or can even be made after first determining data over the entire field in order to detect any chance of an anomaly as discussed above.

Continuing with the discussion, the trigger module 170 has received information on the location of the icon—either the static location 197 from the icon overlay module 190 or the dynamic location 162 from the icon location detection module 160. In addition, the trigger module 170 has received information on the motion vector data from the motion estimation and threshold module 130. Using the received information, the trigger module 170 determines whether the presenter has selected a particular control of the icon. For example, the trigger module 170 determines if the motion vector data within areas of the controls in the icon meet or exceed a threshold. When a control is triggered, the trigger module 170 sends icon trigger information 178 to a content control module 180. In turn, the content control module 180 sends control commands to the content source 140 via a communications channel 184.

The foregoing description of preferred and other embodiments is not intended to limit or restrict the scope or applicability of the inventive concepts conceived of by the Applicants. For example, the embodiment of the presentation system 100 of FIG. 4 has been described as having both an icon overlay module 190 and an icon location detection module 160. It will be appreciated that the presentation system 100 can include only one or the other of these modules 160 and 190 as well as including both. In another example, embodiments of the presentation system 50 of FIG. 3 and 100 of FIG. 4 have been described in the context of videoconferencing. However, with the benefit of the present disclosure, it will be appreciated that the disclosed system and associated methods can be used in other implementations, such as PowerPoint presentations, closed circuit video presentations, video games, etc. Moreover, a content source for the disclosed system can be a computer, a videoconferencing system, a video camera, or other device that provides content. The content for the disclosed system can be moving video, still images, presentation slides, live views of a computer screen, or any other displayable subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An electronically implementable method, comprising:
    capturing video of a presenter;
    adding at least one control at a location in the captured video;
    displaying the captured video with the at least one control on a display for viewing by the presenter;
    determining the location of the at least one control within the captured video;
    detecting a physical motion in the captured video occurring at the determined location of the at least one control; and
    controlling content being communicated from a content source by using the at least one control corresponding to the determined location having the detected physical motion.

2. The method of claim 1, wherein the act of adding the at least one control at the location in the captured video comprises incorporating at least one visual icon associated with the at least one control into the captured video.

3. The method of claim 2, wherein the act of displaying the captured video with the at least one control on the display comprises displaying the at least one visual icon associated with the at least one control in the captured video being displayed.

4. The method of claim 1, wherein the act of determining the location of the at least one control within the captured video comprises determining a location of at least one icon, the at least one icon associated with the at least one control and statically positioned in the captured video.

5. The method of claim 1, wherein the act of determining the location of the at least one control within the captured video comprises determining a location of at least one icon, the at least one icon associated with the at least one control and dynamically positioned in the captured video.

6. The method of claim 1, wherein the act of detecting the physical motion in the captured video occurring at the determined location of the at least one control comprises:
    determining motion data from the captured video occurring at the determined location of the at least one control; and
    determining whether the motion data at least exceeds a threshold.

7. The method of claim 1, further comprising displaying the content from the content source on the same display as the captured video by superimposing the captured video onto the content.

8. The method of claim 1, further comprising displaying the content from the content source on another display different from the display used for the captured video.

9. A program storage device, readable by a programmable control device, comprising instructions stored on the program storage device for causing the programmable control device to perform an electronically implementable method, the method comprising:
    capturing video of a presenter;
    adding at least one control at a location in the captured video;
    displaying the captured video with the at least one control on a display for viewing by the presenter;
    determining the location of the at least one control within the captured video;
    detecting a physical motion in the captured video occurring at the determined location of the at least one control; and
    controlling content being communicated from a content source by using the at least one control corresponding to the determined location having the detected physical motion.

10. A content control system, comprising:
    a content source providing content;
    a display device for viewing by a presenter;
    a camera capturing video of the presenter; and
    a controller communicatively coupled to the content source, the display device, and the camera, the controller receiving captured video of the presenter from the camera and adding at least one control at a location in the captured video, the controller displaying the captured video with the at least one control on the display device for viewing by the presenter and detecting motion data in the captured video, the controller determining the location in the captured video associated with the at least one control and determining if the detected motion data occurs at the determined location of the captured video associated with the at least one control, the controller controlling the content provided by the content source using the at least one control based on the determination.

11. The system of claim 10, wherein the system comprises a videoconferencing unit at least having the camera and the controller integrated therein.

12. The system of claim 10, wherein the at least one control comprises a visual icon incorporated into the captured video of the presenter being displayed.

13. The system of claim 10, wherein to determine if the detected motion data occurs at the location of the captured video associated with the at least one control, the controller determines whether motion data obtained from the captured video at least exceeds a predetermined threshold at the determined location of the at least one control.

14. The system of claim 10, wherein the controller superimposes the captured video onto the content and displays them together on the same display device used for the captured video.

15. The system of claim 10, wherein the controller provides the content to another display device different from the display device used for the captured video.

16. A content control unit, comprising:
   a video module receiving captured video of a presenter, the video module adding at least one control to a location in the captured video and sending the captured video with the at least one control to a display device for viewing by the presenter;
   a detection module at least in communication with the video module, the detection module detecting motion data occurring in the captured video and determining the location of at least one control in the captured video; and
   a control module in communication with the detection module and determining if the detected motion data occurs at the determined location of the at least one control, the control module controlling content being communicated from a content source using the at least one control corresponding to the determined location having the detected motion data.

17. The content control unit of claim 16, wherein the content control unit comprises a videoconferencing unit having a camera in communication with the video module.

18. The content control unit of claim 16, wherein the at least one control comprises a visual icon incorporated into the captured video being displayed, and wherein the detection module comprises an icon detection module in communication with the video module to determine the location of the visual icon in the captured video.

19. The content control unit of claim 16, wherein the at least one control comprises a visual icon, and wherein the detection module comprises an overlay module in communication with the video module and overlaying the visual icon on the captured video.

20. The content control unit of claim 16, wherein to determine if the detected motion data occurs at the location of the captured video associated with the at least one control, the control module determines whether the detected motion data at least exceeds a predetermined threshold at the determined location of the at least one control.

21. The content control unit of claim 16, wherein the control module superimposes the captured video onto the content from the source and displays them together on the same display device.

22. The content control unit of claim 16, wherein the control module has the source provide the content to another display device different from the display device used for the captured video.

* * * * *